United States Patent [19]
Watanabe et al.

[11] 3,784,413
[45] * Jan. 8, 1974

[54] DRY CELLS

[75] Inventors: Jun Watanabe, Osaka; Susumu Hosoi, Neyagawa; Masahiro Kuwazaki, Osaka; Akira Ota, Osaka; Toshikatsu Takata; Junichi Asaoka, both of Moriguchi, all of Japan

[73] Assignee: Matsushita Electric Industrial Co., Ltd., Osaka, Japan

[*] Notice: The portion of the term of this patent subsequent to Mar. 7, 1989 has been disclaimed.

[22] Filed: Aug. 13, 1971

[21] Appl. No.: 171,594

Related U.S. Application Data

[63] Continuation-in-part of Ser. No. 843,598, July 22, 1969, Pat. No. 3,647,552.

[52] U.S. Cl................... 136/131, 136/142, 136/146
[51] Int. Cl. ........................................... H01m 3/00
[58] Field of Search................... 136/142, 143, 144, 136/131, 146

[56] References Cited
UNITED STATES PATENTS

| | | | |
|---|---|---|---|
| 3,018,316 | 1/1962 | Higgins et al. | 136/144 |
| 3,513,033 | 5/1970 | Watanabe | 136/146 X |
| 3,647,552 | 3/1972 | Watanabe et al. | 136/131 |

Primary Examiner—A. B. Curtis
Assistant Examiner—H. A. Feeley
Attorney—Stevens, Davis, Miller & Mosher

[57] ABSTRACT

A dry cell of excellent performances, particularly in discharge characteristics, in which an ion-permeable barrier membrane is interposed between a cathode mixture and a negative electrode-consistuting zinc casing and more specifically between the cathode mixture and a paste layer, said membrane being of such a character that it blocks the transfer of water and a paste from the paste layer side to the cathode mixture side without being dissolvedduring storage and in the earlier stages of discharge of the cell, whereas it is dissolved to prevent a sharp increase of the zinc ion concentration in the vicinity of the paste layer in the latter stage of dscharge of the cell when the zinc ion concentration in the electrolyte is increased.

7 Claims, 7 Drawing Figures

No. 1 — POLYVINYL ALCOHOL BARRIER MEMBRANE CONTAINING 5% OF STARCH

No. 2 — POLYVINYL ALCOHOL BARRIER MEMBRANE CONTAINING 15% OF STARCH

No. 3 — POLYVINYL ALCOHOL BARRIER MEMBRANE CONTAINING 30% OF STARCH

No. 1 — POLYVINYL ALCOHOL BARRIER MEMBRANE CONTAINING 5% OF STARCH

No. 2 — POLYVINYL ALCOHOL BARRIER MEMBRANE CONTAINING 15% OF STARCH

No. 3 — POLYVINYL ALCOHOL BARRIER MEMBRANE CONTAINING 30% OF STARCH

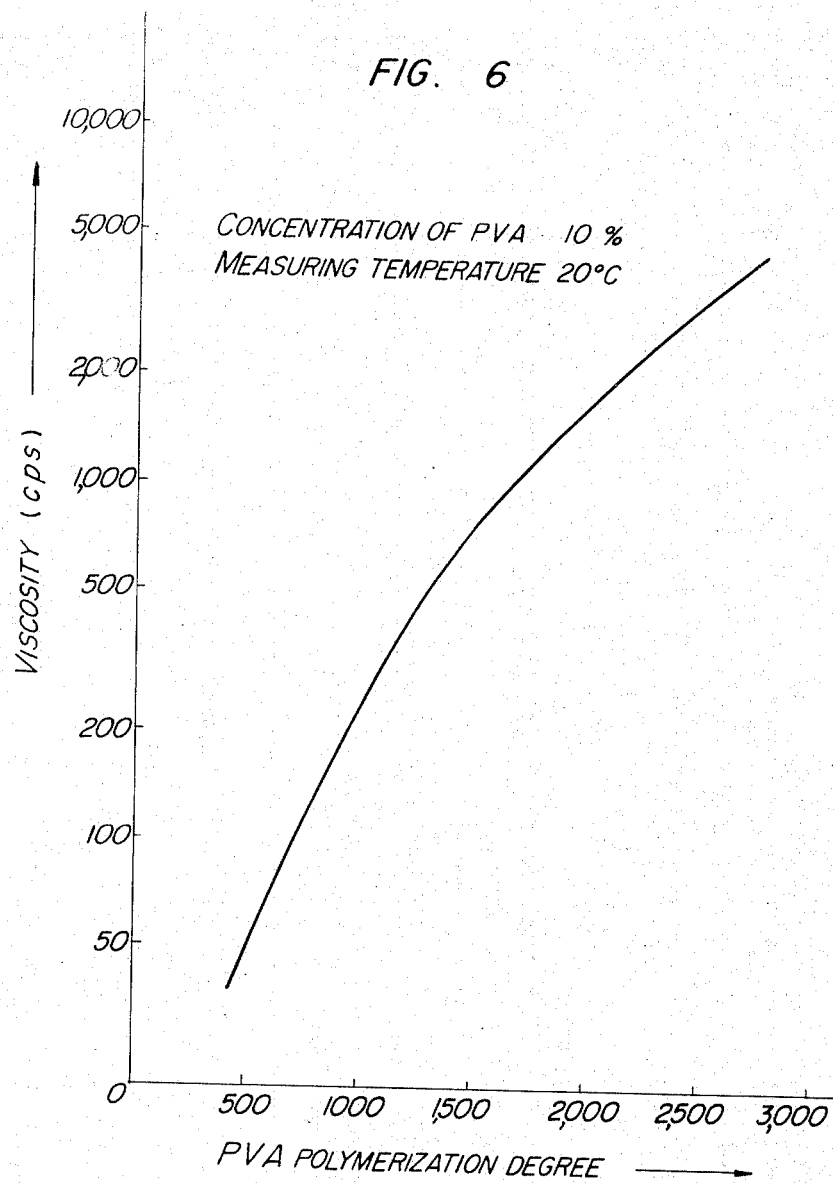

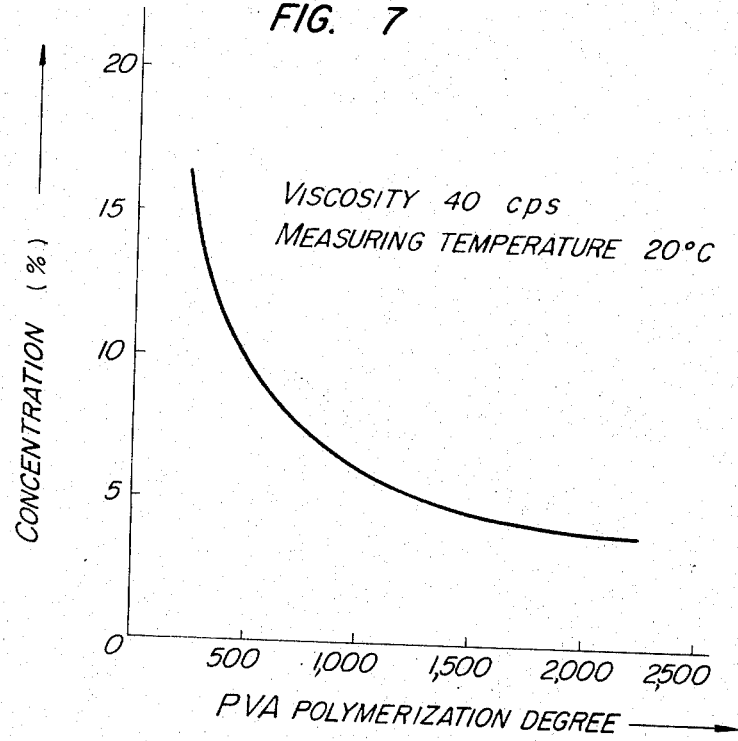

DRY CELLS

CROSS-REFERENCES TO RELATED APPLICATION

This application is a continuation-in-part of Ser. No. 843,598 filed on July 22, 1969 now U.S. Pat. No. 3,647,552.

BACKGROUND OF THE INVENTION

1. Field of the Invention

The present invention relates to improvements in the separator used in dry cells, and more particularly relates to a dry cell having excellent performance, in which an ion-permeable membrane of the character which is dissolved when the zinc ion concentration in the electrolyte has risen beyond a predetermined value is interposed between a cathode mixture and a zinc casing constituting a negative electrode, and more specifically between a paste layer and the cathode mixture, said membrane acting as a barrier during storage of the cell blocking the transfer of water and the paste to the cathode mixture side, as a barrier in the earlier stage of discharge of the cell similarly blocking the transfer of water and the paste, and being dissolved into a paste-like state in the latter stage of discharge of the cell as the zinc ion concentration in the electrolyte increases incident to dissolution of the negative electrode-constituting electrode resulting from the discharge, thereby to increase the discharge capacity and hence improve the performance of the cell.

2. Description of the Prior Art

A dry cell is composed of a positive electrode depolarizer, a separator containing an electrolyte, and a metal constituting a negative electrode. In this type of dry cell, which is called a Leclanche cell, there was used natural manganese dioxide as the positive electrode depolarizer. However, since natural manganese dioxide has a low percentage of effective oxygen with respect to discharge of the cell and a small discharge capacity, it has been customary to use electrolytic manganese dioxide to improve the discharge performance of the cell, which has a high percentage of effective oxygen. On the other hand, as regards the separator the so-called paste-type separator has been used which consists of a gelatinized starch with an electrolyte contained therein. A Leclanche cell which is presently regarded as a high performance cell is composed of a cathode mixture consisting essentially of electrolytic manganese dioxide, acetylene black, ammonium chloride, zinc chloride and water; a paste-type separator impregnated with an electrolyte consisting essentially of ammonium chloride, zinc chloride and water; and an amalgamated zinc casing constituting a negative electrode. With the development of civilization and the development of electronics in recent years, a demand for an inexpensive manganese dry cell is increasing more and more, and further improvements in the discharge performance of the cell, with all the techniques, are desired.

The industrial demand for cells is versatile and the number of types of dry cells presently available has already exceeded scores. The consumption and demand for manganese dry cells depends upon improvements in the intermittent discharge performance thereof, and the improvement in the intermittent discharge performance is obviously influenced by the amount of manganese dioxide contained in the cathode mixture. Namely, how to increase the amount of manganese dioxide in the limited capacity of the cell, while taking account of the storage property and leakage proof property, is the vital factor to improve the intermittent discharge performance of the cell. With this in view, the use of a paper separator in place of the paste-type separator and a carbon post-insertion method to be described later are being studied. This is a method wherein a separator consisting of a Japanese paper, a filter paper or kraft paper which has a paste of starch, dispersed in an electrolyte, coated and dried on one or both faces thereof is interposed between a cathode and a negative electrode-constituting zinc casing and thereafter a positive electrode-constituting carbon rod is inserted into the center of said cathode mixture, said paste being gelatinized with zinc chloride and water present in the cathode mixture or the electrolyte to be added. However, the paste material in the paste layer thus formed is susceptible to oxidation decomposition and deteriorates the depolarizing capacity of the manganese dioxide, so that it was inevitable that the discharge performance and the shelf life of the cell will be impaired. For this reason, a water-soluble cellulose derivative, i.e., synthetic paste, came to be used in place of the natural paste, but such a synthetic paste is defective in that it is less capable of retaining water and further it moves into the cathode mixture penetrating through the paper, along with the water in the separator, when said water is transferred into the cathode during discharge and storage of the cell. The carbon post-insertion method has the following drawback: Namely, when a carbon is inserted into the center of the cathode mixture, a considerably large pressure is exerted over the surface of the lower portion of the paper separator, so that there is the danger of the cathode mixture being forced through the separator and brought into direct contact with the negative electrode-constituting zinc casing. Such an undesirable phenomenon would be eliminated no matter how large the thickness of the paper layer may be, because the paper layer is made at a suitable fiber density so as to impart to it a sufficient water-absorbing property, water-retaining property and strength required for fabrication. In view of the above, it was proposed to use an ion-permeable film, e.g., of polyvinyl alcohol, polyvinyl acetate or the like of low saponification degree, as a barrier to block the transfer of the paste material towards the cathode mixture side, and a few kinds of cells, incorporating such a barrier film, have been produced heretofore. However, although the barrier film is required to have sufficient absorbability, retainability and swellability with respect to the electrolyte and not to be dissoluble and dispersible, those which have actually been used do not entirely satisfy such requirements. Therefore, the use of such a barrier film interior of the separator not only adds to the internal resistance of the cell but also results in the occurrence of a counter electromotive force within the cell and the formation of zinc compounds in the vicinity of the negative electrode-constituting zinc casing because the diffusion velocity of zinc ions through the barrier film is so slow that the sharp increase in the zinc ion concentration at the paste layer as a result of the negative electrode-constituting zinc casing being dissolved during discharge of the cell cannot be alleviated. Thus, the discharge performance of the cell is substantially degraded. Such a phenomenon is obviously very detrimental to the continuous discharge performance of the cell, but also not less detrimental to the intermittent discharge performance of the cell. With the prior art barrier films, the aforesaid undesirable condition was further aggravated since they are all unsatisfactory with respect to absorbability, swellability and adhesive properties. In addition, they imposed an adverse affect on the discharge performance and the storage property of the cell because they did not always produce a satisfactory bond between them and the cathode mixture or the negative electrode-constituting zinc casing. What is particularly important to note here is that the prior art films are not dissolved but remain in their complete shape between the cathode mixture and the negative electrode-constituting zinc casing, even in the latter stage of discharge of the cell, thus making the above-described drawback more apparent. It is for this reason that only a few kinds of dry cells incorporating such a barrier film are in use at the present time and these dry cells are not entirely satisfactory.

As mentioned above, a Leclanche type dry cell is composed of a cathodic mixture consisting essentially of manganese dioxide, acetylene black, ammonium chloride, zinc chloride and water; an amalgamated zinc casing; and a paste-type layer impregnated with an electrolyte consisting essentially of ammonium chloride, zinc chloride and water. However, as the dry cell thus formed has the cathodic mixture and the paste layer adjacent to each other, during storage or discharge, the paste material such as starch, wheat flour or corn starch may be decomposed and the paste material and the water contained in the paste layer may be transferred into the cathodic mixture, and as a result, the discharge performance and storage property may be deteriorated. In view of the above, it was proposed that a barrier membrane is provided between the cathodic mixture and the paste layer; however, the increase in the internal resistance caused by the provision of the ion-permeable barrier membrane, as well as the increase in the concentration polarization caused by the decrease in the diffusion velocity of ions brings about some counter-effects and any complete barrier membrane has not been manufactured yet.

SUMMARY OF THE INVENTION

The present invention contemplates the elimination of the aforesaid drawback possessed by the conventional dry cells. Namely, the object of the present invention is to improve the performance of a dry cell, particularly the discharge performance and the storage property of the cell, by interposing an ionpermeable barrier membrane between a paste layer and a cathode mixture, which membrane has excellent absorbability, retainability, swellability and adhesive properties with respect to the electrolyte or consists of one or more kinds of materials excelling in at least one of absorbability, retainability, swellability and adhesive properties with respect to the electrolyte and which is soluble upon the rising of the zinc ion concentration in the electrolyte. That is, the invention intends to improve the discharge performance and storage property of the cell by providing the ion-permeable barrier membrane between the cathodic mixture and the paste layer, which barrier membrane is dissolved as the zinc ion concentration increases.

In a dry cell in accordance with the present invention, an ion-permeable barrier membrane of polyvinyl alcohol having respectively limited ranges of saponification degree and polymerization degree is provided between a cathodic mixture and a paste layer of the dry cell so that the barrier membrane may be swellable with respect to the electrolyte during storage and the early stage of discharge for preventing the paste material from being decomposed and for blocking the paste material and water from transferring into the cathodic mixture, as a result, the barrier membrane of this invention makes the internal resistance decrease and the diffusion velocity of ions increase as compared with an ionpermeable barrier membrane of the prior art formed of such as polyvinyl alcohol of lower saponification degree or polyvinyl acetate causing both the discharge performance and storage property to be improved. Still further, as the barrier membrane in accordance with the present invention is, at the latter stage of discharge, dissolved to be paste-like owing to the increase of zinc ions caused by the zinc negative electrode being dissolved, the above-mentioned effects, that is, the decrease of the internal resistance and the increase of the diffusion velocity of ions are further enhanced.

The characteristics of polyvinyl alcohol with respect to water are as follows. Polyvinyl alcohol is, although its soluble and insoluble ranges be clearly discriminated from each other because of the presence of the swellable range between them, insoluble in cold or warm water in the saponification range of 0 to 50, soluble in warm water at a temperature in a definite range lower than 70°C at the saponification degree of 60 to about 75, and soluble in warm water but insoluble in cold water at the saponification degree of about 75 to 95. On the other hand, regarding the polymerization degree, the solubility of polyvinyl alcohol for various polymerization degrees, that is, the viscosity versus polymerization degree relationship of polyvinyl alcohol is known as illustrated in FIGS. 6 and 7. FIG. 6 illustrates the polymerization degree versus viscosity relationship of polyvinyl alcohol at a definite concentration, and FIG. 7 illustrates the polymerization degree versus concentration relationship of polyvinyl alcohol at a definite viscosity.

In accordance with the present invention, the abovementioned characteristics of polyvinyl alcohol are employed for a barrier membrane, that is, as polyvinyl alcohol having a saponification degree of 75 to 95 and a polymerization degree of 1,200 to 1,700 shows a satisfactory swelling property for the Leclanche type dry cell which comprises an electrolyte consisting of ammonium chloride, zinc chloride and water, when it is employed for the separator of a dry cell, the abovementioned effects are obtained.

BRIEF DESCRIPTION OF THE DRAWING

FIG. 6 illustrates the polymerization degree versus viscosity relationship of polyvinyl alcohol.

FIG. 7 illustrates the polymerization degree versus concentration relationship of polyvinyl alcohol.

DESCRIPTION OF THE PREFERRED EMBODIMENTS

Figure 1:
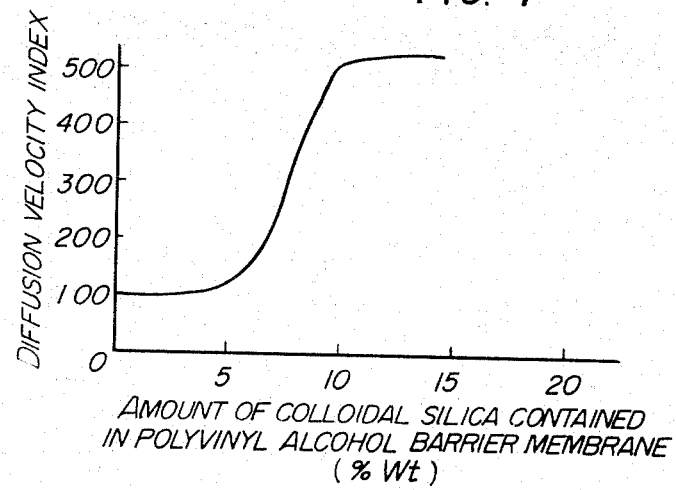
FIG. 1 is a diagram graphically showing the relationship between the amount of colloidal silica contained in a barrier membrane formed of polyvinyl alcohol and the diffusion velocity of zinc ion.

An ion-permeable barrier membrane having excellent absorbability, retainability swellability and adhesive properties may be formed, for example, of polyvinyl alcohol, polyethylene glycol or polyethylene oxide, and by changing the saponification degree and polymerization degree of such polymer it is possible to obtain a membrane which is soluble into a pasty state at any electrolyte concentration at a point of discharge capacity when the membrane is desired to be dissolved. For instance, polyvinyl alcohol is insoluble in electrolyte in the range of saponification degree of 0 to 75 but becomes soluble in the range of saponification degree of 75 to 95 when the zinc ion concentration has reached a level exceeding a predetermined value. Polyethylene glycol and polyethylene oxide also become soluble at a polyvinyl alcohol-solubilizing zinc ion concentration, for example, of about 10 percent as the polymerization degree rises, although this is somewhat variable depending upon the amount of ammonium chloride.

As a material which has at least one of the properties of absorbability, retainability, swellability and adhesive properties, colloidal silica, pulp, agar, polyacrylamide, hydroxypropylcellulose; natural gel forming materials, such as starch, wheat flour, corn starch and karaya gum; synthetic gel forming materials, such as methyl cellulose, methyl ethyl cellulose and carboxy-methyl cellulose; and inorganic salts, such as ammonium chloride, zinc chloride, potassium chloride, sodium chloride, calcium chloride or lithium chloride, which are used for controlling the solubility of barrier membrane and increasing the ion diffusion velocity through the barrier membrane, are thought of. A barrier membrane which is soluble into paste at any concentration of electrolyte at a point of discharge capacity when said membrane is desired to be dissolved, can easily be obtained by incorporating one or more of these materials in the above-described membrane, in the form of powder or solution in a suitable solvent.

The barrier membrane formed in the manner described has excellent absorbability, retainability and swellability. Therefore, when the membrane is disposed within the cell, it contains a large amount of water therein which is hardly movable in said membrane. That is to say that an electrolyte is retained abundantly by the barrier membrane and an internal resistance caused by the membrane is very small and even smaller where the membrane incorporates the aforesaid ingredient or ingredients. In addition, the water present in the vicinity of the ingredient or ingredients serves as a medium for the diffusion of zinc ions through the barrier membrane, so that the diffusion velocity is very high as may be seen in FIG. 1 which shows that the diffusion velocity through a polyvinyl alcohol membrane with 10 percent of collidal silica incorporated therein is 5 times or more as high as that through a membrane consisting solely of a polyvinyl alcohol of a low degree of saponification. Thus, a sharp increase in zinc ion concentration at the paste layer, resulting from the dissolution of the negative electrode-constituting zinc casing during discharge of the cell, can be considerably remedied. Further, the most important feature of the barrier membrane according to the present invention is that the barrier membrane is dissolved when the zinc ion concentration has reached a level higher than a predetermined value due to the dissolution of the negative electrode-constituting zinc casing during discharge of the cell, resulting in an increase in zinc ion concentration, in conjunction with the mixing ratio of ammonium chloride, zinc chloride and water of which the electrolyte is composed and is charged into the cell during its production. This is exemplified in FIG. 2 with reference to polyvinyl alcohol membranes incorporating 5, 15 and 30 percent of starch respectively. Namely, according to the present invention a barrier membrane which is soluble into paste at the time of a desired level of power consumption during discharge operation can be obtained by varying the mixing ratio of ammonium chloride, zinc chloride and water of which the electrolyte is composed and charged at the time of the production of the cell; the type, the saponification degree and the polymerization degree of a material of which the barrier membrane is formed; and the type and the amount of additive or additives to be incorporated in said membrane, if the type of discharge is known. The barrier membrane according to the invention incorporating a material or materials having excellent absorbability, retainability, swellability and adhesive properties with respect to the electrolyte, shows properties equivalent or even superior to those of a paste layer in the conventional paste-type separator, when dissolved into a paste. The barrier membrane thus dissolved enables a further higher ion diffusion velocity to be obtained and thereby gives a highly favorable influence on the discharge performance of the cell. Moreover, the barrier membrane according to the invention produces a good bond between it and the cathode mixture or negative electrode-constituting zinc casing, not only in the state of a paste upon dissolution, but also in its shape and is, therefore, highly suitable for the discharge reaction.

As described above, the barrier membrane of this invention is capable of retaining a large amount of electrolyte therein over an extended period and additionally it is highly effective for preventing the decomposition of the paste and the displacement of the same towards the cathode mixture side which is considered as one of the causes for the sharp voltage drop of a cell during storage and discharge operation. In view of the foregoing, it can be said that the barrier membrane according to this invention is highly valuable for the manufacture of dry cells of the type incorporating a film designed to be dissolved during the discharge operation. Furthermore, the barrier membrane of this invention completely attains the primary objects of this type of membrane, that is, to prevent penetration of the cathode mixture through the separator paper and to prevent the transfer of water and paste material into the cathode mixture.

The barrier membrane according to this invention may be prepared so that when used in a dry cell as a separator layer, it may stand as such, without being dissolved, throughout the period of discharge operation or may be dissolved into paste in the course of the discharge operation or may retain its shape before incorporation into a cell but be gelatinized at the same time when the cell is produced.

Now, some embodiments of the dry cell incorporating an ion-permeable barrier membrane according the this invention, which is so prepared as to be dissolved at a voltage of 1.0 to 0.9 V when the cell is discharged for 30 minutes a day with a load of 4 ohms connected thereto, will be described hereunder with reference to FIG. 3, which is a side elevation of a dry cell according to this invention, with a half side thereof shown in section.

EXAMPLE 1

80 parts of manganese dioxide, 10 parts of acetylene black, 25 parts of ammonium chloride, 5 parts of zinc chloride and 20 parts of water are blended to a suitable degree and the mixture is molded to form a cathodic mixture 1. On the other hand, a paste composed of 50 parts of polyethylene, 35 parts of methyl cellulose, 5 parts of polyacrylamide, 5 parts of pulp and 5 parts of starch is applied to the inner surface of a negative electrode-constituting zinc casing 3 in a molten state at a temperature of 100° to 150°C to form a paste layer 4, and after placing a sheet of paper 5 at the bottom of the zinc negative electrode 3, an electrolyte composed of 20 parts of ammonium chloride, 8 parts of zinc chloride and 72 parts of water is charged into said zinc casing. Thereafter, the cathodic mixture 1 thus molded is wrapped by a barrier membrane 2 of polyvinyl alcohol having a thickness of 40μ, a saponification degree of 90 and a polymerization degree of 1,500 to be inserted into the zinc casing 3, and a positive electrode-constituting carbon rod 6 is inserted into the center of the cathodic mixture, whereby a bare cell is formed. The separator layer thus formed withstands sufficiently a large pressure imposed on the lower portion thereof, in the practice of the carbon post-insertion method, due to the presence of the flexible barrier membrane according to the present invention, and the paste is sufficiently gelatinized, and thus the effect of the barrier membrane aimed at by the present invention is fully attained. In the light of the foregoing, it may be said that the barrier membrane of this invention is an ideal separator.

Figure 3:
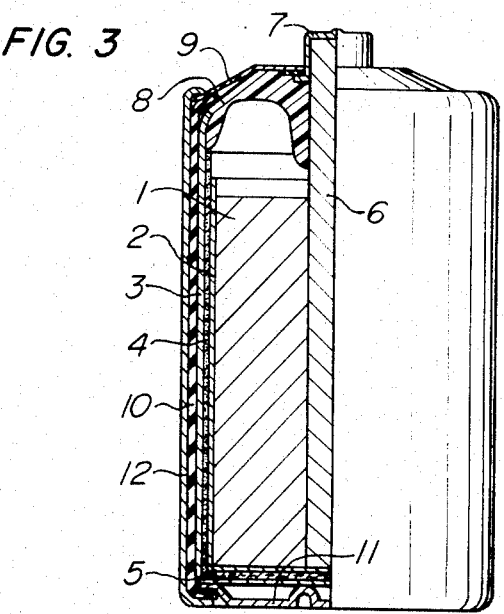
FIG. 3 is a side elevation of a dry cell according to the present invention, with a half side thereof shown in section.

Furthermore, in FIG. 3, reference numeral 7 designates a positive electrode terminal cap, 8 a sealing member made of a synthetic resin, 9 a metallic closure member, 10 a heat-contractive synthetic resin tube, 11 a negative electrode terminal plate and 12 an outer casing.

EXAMPLE 2

A dry cell as defined in Example 1 in which the barrier membrane 2 contains polyvinyl alcohol of a saponification degree of 75 and a polymerization degree of 1,200.

EXAMPLE 3

A dry cell as defined in Example 1, in which the barrier membrane 2 contains polyvinyl alcohol of a saponification degree of 75 and a polymerization degree of 1,700.

EXAMPLE 4

A dry cell as defined in Example 1, in which the barrier membrane contains polyvinyl alcohol of a saponification degree of 95 and a polymerization degree of 1,200.

EXAMPLE 5

A dry cell as defined in Example 1, in which the barrier membrane contains polyvinyl alcohol of a saponification degree of 95 and a polymerization degree of 1,700.

The characteristics of these dry cells as described in the above five Examples are almost the same with respect to storage capacity and substantially the same with respect to discharge capacity though the discharge characteristics at strong currents are different from each other within 7 percent.

Figure 2:
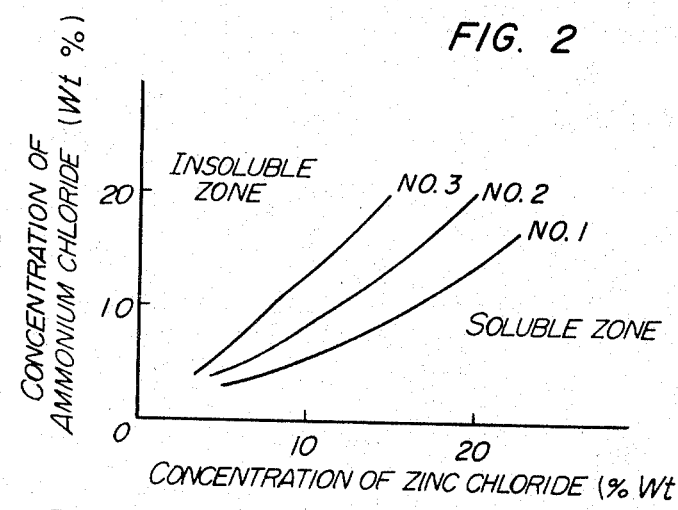
FIG. 2 is a diagram graphically showing the solubility of a starch-containing polyvinyl alcohol barrier membrane relative to an electrolyte composed of ammonium chloride, zinc chloride and water.

The solubility of the barrier membrane according to the present invention at the latter stage of discharge is further enhanced as a result of the membrane containing one or a plurality of materials having at least one of the properties of absorbability, retainability, swellability and adhesive properties, for example, colloidal silica, pulp, agar, polyacrylamide, hydroxypropyl cellulose; natural gel forming materials such as starch, wheat flour, corn starch and karaya gum; synthetic gel forming materials such as methyl celllulose, methyl ethyl cellulose and carboxymethyl cellulose; and inorganic salts such as ammonium chloride, zinc chloride, potassium chloride, sodium chloride and lithium chloride, and the barrier membrane becomes an optimal paste for the dry dry cell after dissolving. Further, the addition of the above-mentioned materials also enhance the ion diffusion velocity through the barrier membrane. One example of this effect in the case of the polyvinyl alcohol barrier membrane containing colloidal silica is illustrated in FIG. 1, in which the velocity of zinc ions in the electrolyte passing through the barrier membrane is shown as the diffusion velocity index. These effects are brought about not only by the additives themselves having the properties of absorbability, retainability, swellability and adhesive properties but also by an electrolyte existing on the interface between polyvinyl alcohol and the additives, after all, by a large amount of electrolyte existing in the barrier membrane.

Now, some embodiments of the dry cell employing the barrier membrane containing some additives according to this invention will be described.

EXAMPLE 6

A dry cell as defined in Example 1, in which the barrier membrane consists of 90 parts of polyvinyl alcohol having a saponification degree of 90 and a polymerization degree of 1,500 and 10 parts of colloidal silica.

EXAMPLE 7

A dry cell as defined in Example 1, in which the barrier membrane consists of 95 parts of polyvinyl alcohol having a saponification degree of 90 and a polymerization degree of 1,500 and 5 parts of methyl cellulose.

EXAMPLE 8

A dry cell as defined in Example 1, in which the barrier membrane consists of 95 parts of polyvinyl alcohol having a saponification degree of 90 and a polymerization degree of 1,500 and 5 parts of ammonium chloride.

EXAMPLE 9

A dry cell as defined in Example 1, in which the barrier membrane consists of 97 parts of polyvinyl alcohol having a saponification degree of 90 and a polymerization degree of 1,500 and 3 parts of zinc chloride.

These dry cells as described in the above four examples are, as compared with the dry cells comprising a barrier membrane consisting of only polyvinyl alcohol of a saponification degree of 90 and a polymerization degree of 1,500, substantially the same in storage property while superior in discharge capacity.

Figure 4:
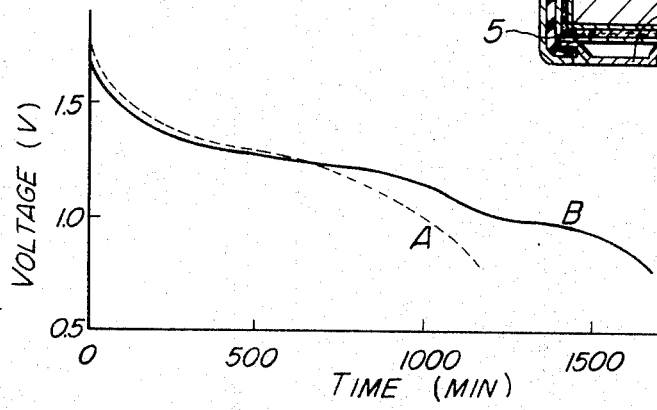
FIG. 4 shows discharge performance curves obtained where the discharge has been performed on a 4 Ω load resistor for 30 minutes a day.
Figure 5:
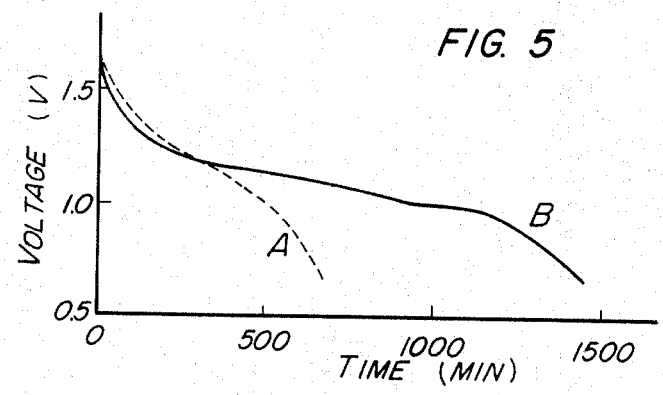
FIG. 5 shows discharge performance curves obtained by the ASA Heavy Industrial Test wherein intermittent discharge has been repeated on a 4 Ω load resistor to discharge for 4 minutes and to stop for 11 minutes, the intermittent discharge cycle being continued for 8 hours a day.

With A representing the conventional paste-type dry cell described before and B representing the dry cell according to this invention as described in Example 1, the discharge performances, the storage properties and the leakage-proof properties of the respective cells are compared with each other on the basis of the R-20 type, the results of which are shown in Tables 1, 2 and 3, and the discharge curves of the respective cells are shown in FIGS. 4 and 5 in which FIG. 4 illustrates the intermittent discharge performance (30 min/day) with 4 Ohm load and FIG. 5 illustrates the intermittent discharge performance (4min/15 min) with 4 Ohm load. It will be seen from this data that the dry cell incorporating the barrier membrane according to the invention is superior to the conventional cell as regards discharge performance, storage and leakage-proof properties.

TABLE 1

Comparison of Intermittent Discharge Performance (30 min./day) with 4-Ohm Load

|   | Immediately after production | After 6-Month Storage at 45°C. |
|---|---|---|
| A | 1020 min. | 840 min. |
| B | 1400 min. | 1320 min. |

TABLE 2

Comparison of Storage Property in Terms of Number of Defective Dry Cells in 100 Dry Cells

|   | After 6-Month Storage at 45°C | After 12-Month Storage at 45°C. |
|---|---|---|
| A | 1 | 3 |
| B | 0 | 0 |

TABLE 3

Comparison of Leakage-Proof Property in Terms of Number of Defective Dry Cells in 50 Dry Cells after 24-Hour Continuous Discharge with 4-Ohm Load

|   | After Storage for 30 Days | After Storage for 60 Days |
|---|---|---|
| A | 20 | 50 |
| B | 1 | 3 |

We claim:

1. A dry cell comprising a cathodic mixture, a zinc negative electrode, a paste layer formed on one side of said zinc negative electrode confronting said cathodic mixture, and an ion-permeable barrier membrane interposed between said cathodic mixture and said paste layer, said barrier membrane consisting of polyvinyl alcohol having a saponification degree of 75 to 95 and a polymerization degree of 1,200 to 1,700.

2. A dry cell as defined in claim 1, in which said ion-permeable barrier membrane has colloidal silica contained therein.

3. A dry cell as defined in claim 1, in which said ion-permeable barrier membrane has contained therein at least one material selected from the group consisting of pulp, methyl cellulose, methyl ethyl cellulose, carboxymethyl cellulose and hydroxypropyl cellulose.

4. A dry cell as defined in claim 1, in which said barrier membrane has contained therein at least one material selected from the group consisting of starch, wheat flour and corn starch.

5. A dry cell as defined in claim 1, in which said ion-permeable barrier membrane has polyacrylamide contained therein.

6. A dry cell as defined in claim 1, in which said ion-permeable barrier membrane has karaya rubber contained therein.

7. A dry cell as defined in claim 1, in which said ion-permeable barrier membrane has contained therein at least one material selected from ammonium chloride, zinc chloride, potassium chloride, sodium chloride and lithium chloride.

* * * * *